(12) United States Patent
Luke

(10) Patent No.: US 8,433,560 B2
(45) Date of Patent: Apr. 30, 2013

(54) RULE BASED APPARATUS FOR MODIFYING WORD ANNOTATIONS

(75) Inventor: James Steven Luke, Isle of Wight (GB)

(73) Assignee: International Business Machines Corporation, Armonk, NY (US)

( * ) Notice: Subject to any disclaimer, the term of this patent is extended or adjusted under 35 U.S.C. 154(b) by 903 days.

(21) Appl. No.: 12/416,612

(22) Filed: Apr. 1, 2009

(65) Prior Publication Data
US 2009/0248400 A1 Oct. 1, 2009

(30) Foreign Application Priority Data

Apr. 1, 2008 (EP) .................................. 08153921

(51) Int. Cl.
*G06F 17/27* (2006.01)
(52) U.S. Cl.
USPC ...... 704/9; 704/1; 704/10; 707/706; 707/707; 707/708
(58) Field of Classification Search .................. 704/1, 9, 704/10; 707/706–708
See application file for complete search history.

(56) References Cited

U.S. PATENT DOCUMENTS

| | | | | |
|---|---|---|---|---|
| 5,404,295 A * | 4/1995 | Katz et al. | ...................... | 715/231 |
| 7,080,004 B2 * | 7/2006 | Wang et al. | ...................... | 704/9 |
| 7,139,752 B2 * | 11/2006 | Broder et al. | ...................... | 1/1 |
| 7,254,576 B1 * | 8/2007 | Hamilton | ...................... | 707/706 |
| 7,319,994 B1 * | 1/2008 | Sercinoglu | ...................... | 1/1 |
| 7,558,778 B2 * | 7/2009 | Carus et al. | ...................... | 1/1 |
| 7,702,604 B1 * | 4/2010 | Hauser | ...................... | 706/45 |
| 7,860,876 B2 * | 12/2010 | Frieder et al. | ...................... | 707/759 |
| 7,949,626 B1 * | 5/2011 | Hauser | ...................... | 706/59 |
| 7,970,724 B1 * | 6/2011 | Hauser | ...................... | 706/47 |
| 2001/0042085 A1 * | 11/2001 | Peairs et al. | ...................... | 707/526 |
| 2001/0056414 A1 * | 12/2001 | Christal et al. | ...................... | 707/1 |
| 2003/0018632 A1 * | 1/2003 | Bays et al. | ...................... | 707/3 |
| 2004/0163042 A1 * | 8/2004 | Altman | ...................... | 715/512 |
| 2004/0181746 A1 * | 9/2004 | McLure et al. | ...................... | 715/500 |
| 2004/0205482 A1 * | 10/2004 | Basu et al. | ...................... | 715/500.1 |
| 2005/0108001 A1 * | 5/2005 | Aarskog | ...................... | 704/10 |
| 2005/0262051 A1 * | 11/2005 | Dettinger et al. | ...................... | 707/3 |
| 2006/0047500 A1 * | 3/2006 | Humphreys et al. | ...................... | 704/9 |
| 2006/0253274 A1 * | 11/2006 | Miller | ...................... | 704/9 |
| 2007/0192085 A1 * | 8/2007 | Roulland et al. | ...................... | 704/9 |
| 2007/0282592 A1 * | 12/2007 | Huang et al. | ...................... | 704/9 |
| 2008/0091408 A1 * | 4/2008 | Roulland et al. | ...................... | 704/9 |
| 2008/0109212 A1 * | 5/2008 | Witbrock et al. | ...................... | 704/9 |
| 2008/0195597 A1 * | 8/2008 | Rosenfeld et al. | ...................... | 707/5 |
| 2008/0256062 A1 * | 10/2008 | Dettinger et al. | ...................... | 707/5 |
| 2008/0262833 A1 * | 10/2008 | Kano et al. | ...................... | 704/10 |
| 2008/0319978 A1 * | 12/2008 | Brun et al. | ...................... | 707/5 |
| 2010/0010970 A1 * | 1/2010 | Takeuchi et al. | ...................... | 707/3 |

* cited by examiner

*Primary Examiner* — Richemond Dorvil
*Assistant Examiner* — Lamont Spooner
(74) *Attorney, Agent, or Firm* — Thomas E. Lees, LLC

(57) ABSTRACT

A rule based apparatus and method for modifying word annotations in an annotated text base is described. The apparatus includes an index creator component for creating an index of word annotations. An annotations modifying component for modifying word annotations, and a retriggering component, responsive to said annotations modifying component, for retriggering a rules engine to modify all occurrences of a matching word annotation in said annotated text base and updating the index of word annotations with the modified occurrences of a matching word annotation in said annotated text base.

20 Claims, 5 Drawing Sheets

RULE BASED APPARATUS FOR MODIFYING WORD ANNOTATIONS

FIELD OF THE INVENTION

The invention relates to the field of text analytics. In particular the invention relates to an improved text analytics application for a rule based apparatus for modifying word annotations.

BACKGROUND

Text analytic solutions involve the process of annotating data within natural language documents with information. The annotations allow a text analytics application to scan information written in a natural language in order to extract information and populate a database or search index with the extracted information. Information is extracted from a document according to a set of rules defined in the text analytics application. Text analytic applications typically comprise two types of rules. These two types of rules can be typically categorised as follows:
1. Dictionary Rules—these rules define the annotations that should be applied whenever a specified phrase is encountered. For example, the phrase 'International Business Machines' should be annotated as an 'Organisation '.
2. Grammatical Rules—these rules define the annotations that should be applied whenever a grammatical pattern is encountered. For example:
a. a grammatical pattern comprising the phrase 'member of' followed by any 'Name'. When encountered the 'Name' annotation should be changed to an 'Organisation' annotation. For example, this grammatical rule would identify IBM as an 'Organisation' in the phrase 'he is a member of IBM's staff'.
b. A grammatical pattern comprising a 'Name' followed by a 'Verb' followed by a 'Name'. This pattern can be extracted into a Subject-Object-Predicate triple for use in a semantic knowledge base.

When presented with a test corpus of documents, text analytics applications are designed to identify those parts of the document that will cause a rule to be triggered. For example, the need to identify the occurrence of dictionary terms within a document would trigger dictionary rules when the text analytics application scans the document and locates a dictionary term.

The rules used in text analytic applications are developed in a hierarchical arrangement such that when one rule is triggered the triggered rule may trigger other rules. Consider for example, the annotation sequence that would occur for the following sentence:
'John works for Rob & Benn.'
Using a simple set of dictionaries it is possible to annotate each term in the sentence as shown below:

| | |
|---|---|
| John -> | Name |
| works -> | Verb |
| for -> | Preposition |
| Rob -> | Verb |
| & -> | Conjugate |
| Benn -> | Noun |
| . -> | Punctuation |

Rule 1 is a dictionary rule that states the word 'Benn' is a 'Name'.

Rule 2 is a grammatical rule that states and 'Capitalised Verb' (i.e. 'Rob' in this case) that is followed by a 'Conjugate' and a 'MaleName' should be annotated as a 'Name'.

Rule 3 is a grammatical rule that states a phrase comprising a 'Verb' followed by a 'Preposition' should be annotated as a 'VerbPhrase'.

Rule 4 is a grammatical rule that states a 'Name' preceded by a 'VerbPhrase' with a text value of 'worksfor' should be annotated as an 'Organisation '.

Rule 5 is a grammatical rule that states if an 'Organisation' is followed by a 'Conjugate' followed by a 'Name' followed by a full stop then the 'Name' should be included in the 'Organisation' annotation.

In this example, each of the rules would trigger and result in the updated annotations below (the example has been designed so that rules trigger in a specified order, however, a person skilled in the art will realise that a set of rules may trigger in any given order):

| | |
|---|---|
| John -> | Name |
| works for -> | VerbPhrase |
| Rob & Benn-> | Organisation |
| . -> | Punctuation |

Conventional text analytic applications parse documents looking for patterns that match the rules. So, in the example above, the application will first test 'rule 1' against the word 'John, followed by the word 'works', followed by the word 'for', and so on until the end of the document is reached.

Whenever a rule triggers and an annotation is changed the cursor must be reset to the earliest point at which the change could impact the likelihood of another rule triggering. The parsing of the document must then be repeated until all matching rules have also triggered.

After the test corpus has been parsed by the text analytics application, the impact of any changes in the dictionaries, rules or corpus content can only be determined by re-parsing the entire corpus.

SUMMARY OF THE INVENTION

One embodiment of the invention provides an indexing algorithm which eliminates the need to parse the entire document corpus. A preferred embodiment of the present invention advantageously provides for indexing not only the text contained in a document, but also the annotations applied to the document by the rules. The annotations are indexed for all states of the document. In other words, when rules cascade such that a term is annotated and that annotation is then changed by a further rule triggering, the full sequence of annotations is indexed.

Viewed from a first aspect, a rule based apparatus is provided for modifying word annotations in an annotated text base, the apparatus comprising: an index creator component for creating an index of word annotations; an annotations modifying component for modifying word annotations; and a retriggering component, responsive to said annotations modifying component, for retriggering a rules engine to modify all occurrences of a matching word annotation in said annotated text base and updating the index of word annotations with the modified occurrences.

Preferably, the rule based apparatus further comprises a tokenising component for identifying a word, a number or a punctuation mark associated with a document to be stored in the annotated text base.

Viewed from a second aspect, a rule based method is provided for modifying word annotations in an annotated text base. The method comprising the steps of creating an index of word annotations, modifying a word annotation, and retriggering a rule to modify all occurrences of a matching word annotation in said annotation text base, in response to the modifying step.

Viewed from a third aspect, a computer program product is provided loadable into the internal memory of a digital computer, comprising software code portions for performing, when said product is run on a computer, to carry out an embodiment of the invention described above.

The rule based apparatus aims to achieve a step change in the analysis of unstructured text by eliminating the division between analysis engine development and runtime application. Conventional text analytics is based on an offline process for analysis engine development where the Developer makes changes to dictionaries, heuristics and rules and then tests those changes against a test corpus. If the performance of the analysis engine is acceptable against the test corpus it is deployed to a runtime environment. The runtime environment then applies the analysis engine to all documents in the existing corpus and any new documents on receipt.

The separation of the development and runtime processes causes 3 issues:
1. Analysis engine development is undertaken using a sample of documents taken from the entire corpus. Whilst the Developer will always attempt to ensure that the sample is representative of the complete corpus this is an inherently hard problem. It is not possible to guarantee a representative sample without first analysing the entire corpus, however the corpus cannot be fully analysed without first developing an appropriate analysis engine that cannot in turn be developed without first defining a representative sample.
2. Any changes in the analysis engine require a re-parse of all documents previously analysed. Depending on the number of documents in the corpus the time taken to re-parse can range from several hours to several weeks.
3. The analysis engine development time must include additional time for testing and deployment activities.

Issues (2) and (3) mean that there is a considerable time lag between any changes in the analysis engine and the delivery of operational results by the runtime system.

The rule based apparatus may deliver a single dynamic process where: new documents are analysed immediately with results made available to Users in real-time. new rules, heuristics and dictionary amendments are applied immediately to all existing documents and the update results made available to Users in real-time.

The rule based apparatus may eliminate the lag time between analysis engine development and results generation. More importantly, analysis results may be improved as changes in the analysis engine will be based on the entire document corpus and feedback will be instantaneous. This means that the Developer can rapidly experiment with many different configurations in order to achieve the best possible results. Finally, as the entire document corpus will be analysed it will be possible for the Developer to specify one off exceptions and thereby eliminate inaccurate results.

The performance requirements of the rule based apparatus can be delivered by:
1. free text indexing all documents to enable the rapid identification of those documents impacted by a dictionary change.
2. rule indexing to enable the rapid identification of documents and parse tree components impacted by a change in a rule.
3. parse tree, or annotation, indexing to enable the rapid identification of documents and parse tree components impacted by a change in a rule.
4. selective re-parsing algorithms such that only the minimum sub-components of any document are re-parsed following any changes in the analysis engine.

BRIEF DESCRIPTION OF THE DRAWINGS

Embodiments of the invention are described below in detail, by way of example only, with reference to the accompanying drawings in which.

DETAILED DESCRIPTION OF THE INVENTION

Figure 1:
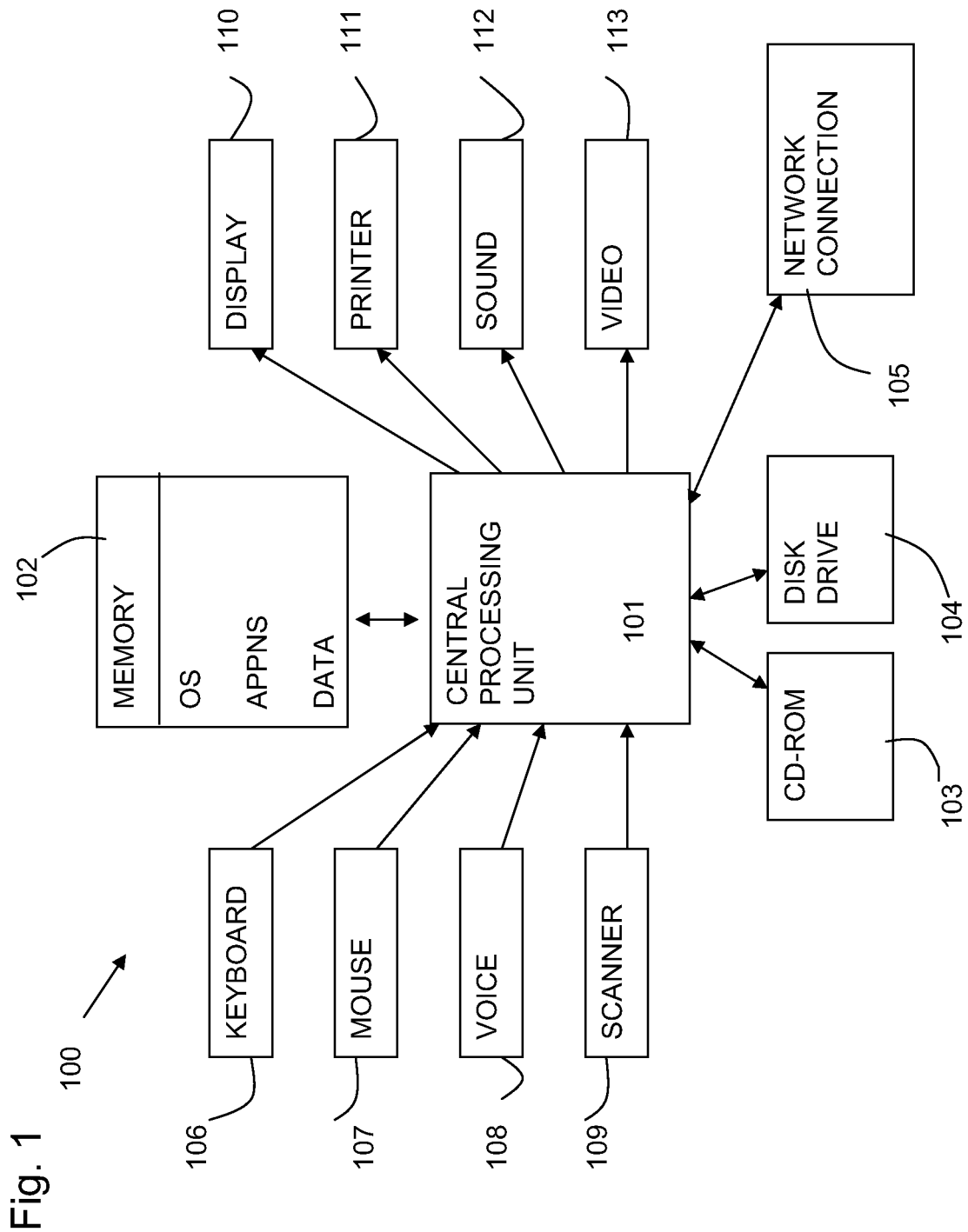
FIG. 1 is a block diagram detailing a computer system in which the present invention may be embodied.

In accordance with an embodiment of the present invention a computer system is provided in which a preferred embodiment of the improved text analytic applications may be implemented.

The computer system 100 has a central processing unit 101 with primary storage in the form of memory 102 (RAM and ROM). The memory 102 stores program information and data acted on or created by application programs. The program information includes the operating system code for the computer system 100 and application code for applications running on the computer system 100. Secondary storage includes optical disk storage 103 and magnetic disk storage 104. Data and program information can also be stored and accessed from the secondary storage.

The computer system 100 includes a network connection means 105 for interfacing the computer system 100 to a network such as a local area network (LAN) or the Internet. The computer system 100 may also have other external source communication means such as a fax modem or telephone connection.

The central processing unit 101 comprises inputs in the form of, as examples, a keyboard 106, a mouse 107, voice input 108, and a scanner 109 for inputting text, images, graphics or the like. Outputs from the central processing unit 100 may include a display means 110, a printer 111, sound output 112, video output 113, etc.

In a distributed system, a computer system 100, as shown in FIG. 1, may be connected via the network connection 105 to a server (not shown) on which applications may be run remotely from the central processing unit 101.

Applications may run on the computer system 100 from a storage means 103, 104 or via a network connection 105, which may include database applications etc. A user's computer system is not limited to any type of data processing system or apparatus, and may be a conventional desktop or lap-top personal computer, a personal digital assistant or a mobile phone or any other specialized data processing device, which is capable of running a text analytic application.

Figure 2:
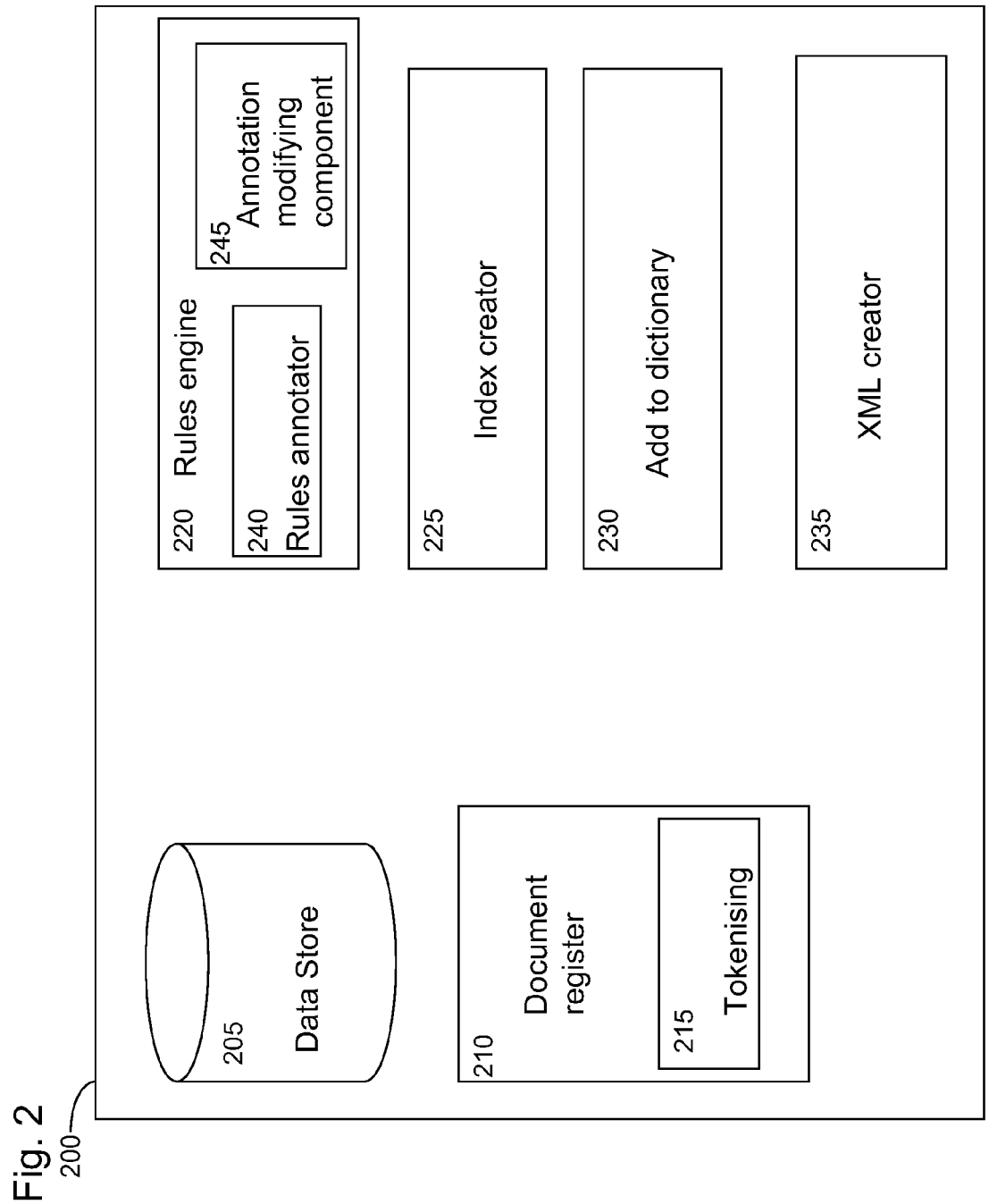
FIG. 2 is a block diagram showing the components of the improved text analytic application in accordance with an embodiment of the present invention.

FIG. 2 shows a block diagram of the components of the text analytic application 200, the components comprise a data store 205 for storing a plurality of natural language documents which have been registered with the text analytic application an annotation array and an index created by an index creator component 225, a document register component 210 for registering a natural language document with the text analytics application, a tokenising component 215 for parsing the registered document in order to generate a reference to each individual word, number and/or punctuation mark in an index, an index creator component 225 for creating an index of references of each identified word, number and/or punctuation mark, an XML creator component 235 for creating an XML representation of the index, an add to dictionary component 230 for adding dictionary rules and a rules engine component 220 comprising dictionary rules and further comprising an rules annotator component 240 and an annotation modifying component 245 for determining the existence of a tokenised item in an index and modifying an annotation in an annotations array in response to a tokenised item being found in the tokenised array and a retriggering component 250 for retriggering the dictionary rules to modify all occurrences of a matching annotation in all of the registered documents.

The type of document registered with the text analytic application 200 is preferably, a document written in a natural language. However, it will be appreciated by a person skilled in the art that any form of document comprising unstructured text may be registered with the text analytic application 200.

The document register component 210 logs the name of the document which is to be analysed by the text analytic application 200. The document register component 210 stores the received document in the data store 205. On registration, each document is tokenization by the tokenization component 215 to identify individual words, numbers and punctuation marks. During tokenization, the index creator component 225 in combination with the rules engine engine component 220 creates a reference to each individual word and adds this to an index created by the index creator component 225. The index comprises a list of all the words encountered together with a list of references for each word. In addition, the index stores the initial annotation for each word determined by dictionary rules as defined by the rules engine. The default annotations are Alpha for words, Numeric for numbers and Punt for punctuation.

Figure 3:
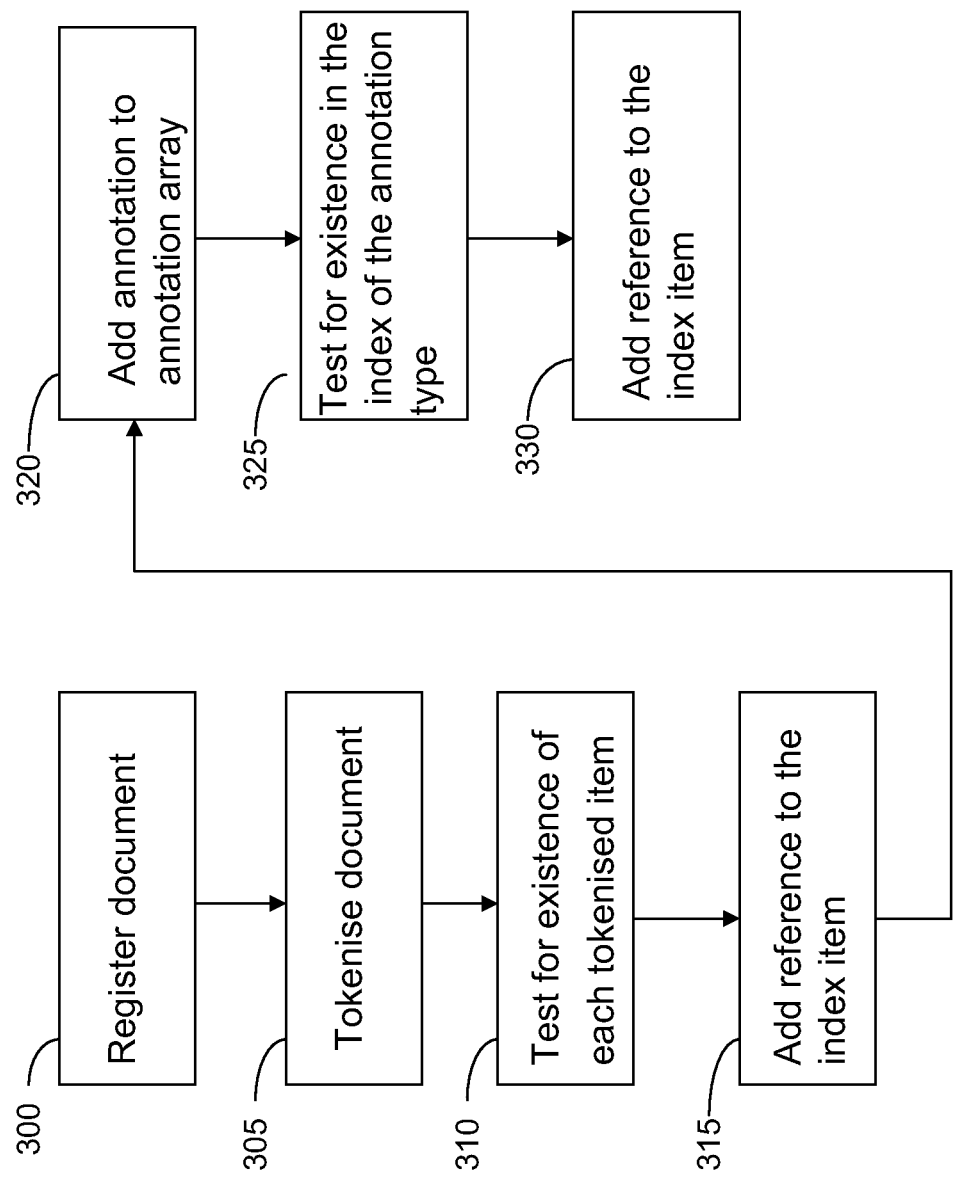
FIG. 3 is flow chart detailing the operational steps of registering a document with the text analytic application of FIG. 2 in accordance with an embodiment of the present invention.
Figure 4:
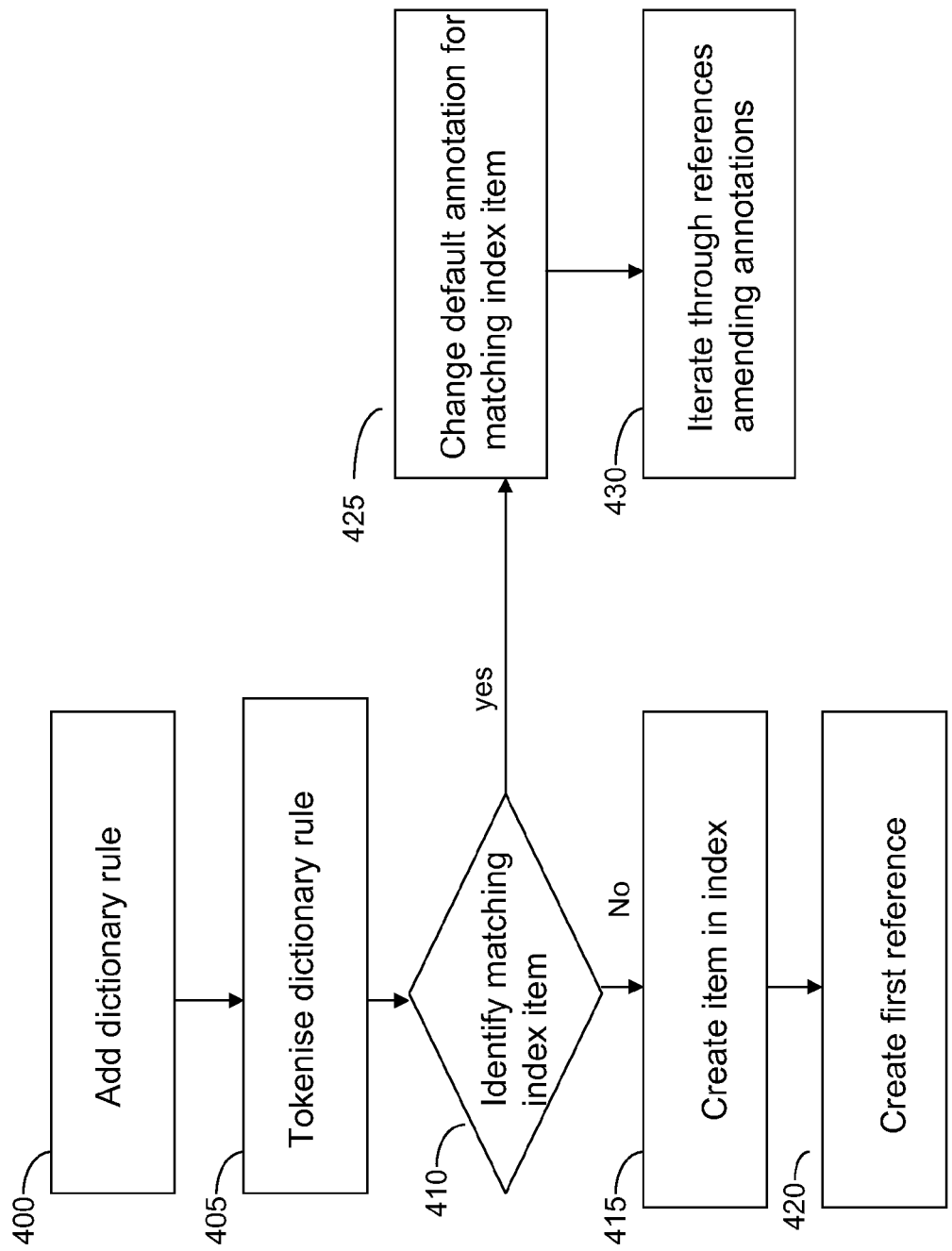
FIG. 4 is a flow chart showing the operational steps of adding a single word dictionary rule to the text analytic application of FIG. 2 in accordance with an embodiment of the present invention.
Figure 5:
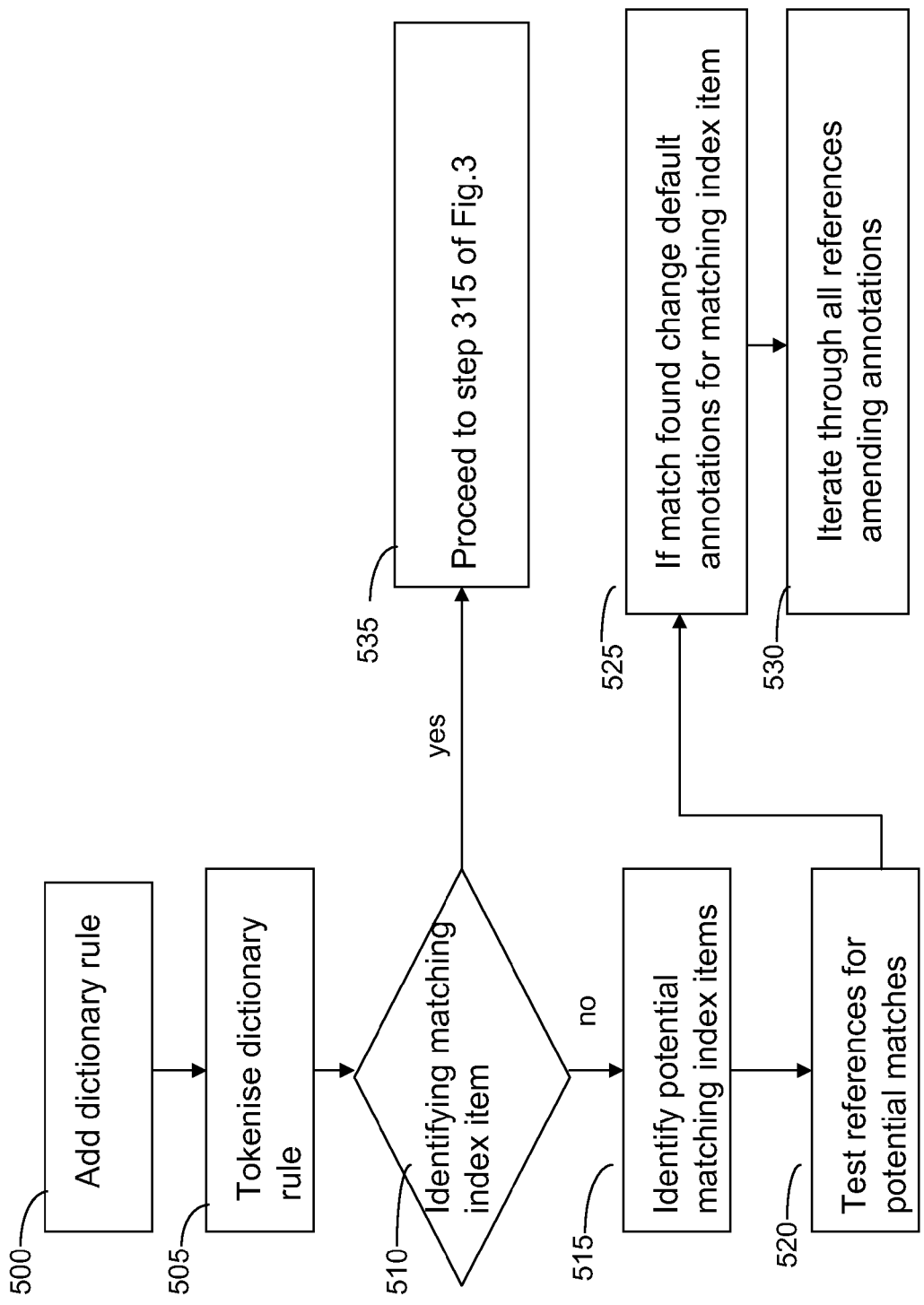
FIG. 5 is a flow chart showing the operational steps of adding a multiple word rule to the text analytic application of FIG. 2 in accordance with an embodiment of the present invention.

The description of the operation of the text analytics application 200 will be based on an example corpus of three documents and should be read in conjunction with FIGS. 3 to 5:

Document One
John called Smith about John Smith.
Document Two
Smith worked for John Smith, the IT company.
Document Three
John Smith was owned by John.
Registering Documents Document one and two are registered with the text analytics application 200 by the document register component 210 (step 300). On registration, each document is tokenised by the tokenising component 215 to identify individual words, numbers and punctuation marks (step 305). During tokenisation, a reference to each individual word is added to the index by the index creator component 225 (step 310). The index comprises a list of all the words encountered to date together with a list of references for each word (step 315). In addition, the index stores the initial annotation for each word determined by dictionary rules. The default annotations are Alpha for words, Numeric for numbers and Punt for punctuation.

In addition to creating index references, the index creator component 225 creates an array of annotations for Document one and two (step 320). Each annotation is indexed meaning that the index includes a list of reference for each annotation. The index and annotation data structures, together with the data structures storing the original document, are fully cross referenced (step 325 and 330). This ensures that it is possible to rapidly identify all occurrences of a particular word or annotation. The rules annotator component 240 identifies the word associated with any particular annotation or the annotation associated with a word. This cross referencing is hierarchical such that it is possible to identify the full hierarchy of annotations for a particular word and vice versa.

In the example below the default annotations are shown for Document one by calling the XML creator component 235. The XML returned by the XML creator component 235 is as follows:

```
<Document>
<Alpha Value="John" Start="0" Length="4"/>
<White Value=" " Start="4" Length="1"/>
<Alpha Value="called" Start="5" Length="6"/>
<White Value=" " Start="11" Length="1"/>
<Alpha Value="Smith" Start="12" Length="5"/>
<White Value=" " Start="17" Length="1"/>
<Alpha Value="about" Start="18" Length="5"/>
<White Value=" " Start="23" Length="1"/>
<Alpha Value="John" Start="24" Length="4"/>
<White Value=" " Start="28" Length="1"/>
<Alpha Value="Smith" Start="29" Length="5"/>
<Punct Value="." Start="34" Length="1"/>
</Document>
```

The XML for the second example document is:

```
<Document>
<Alpha Value="Smith" Start="0" Length="5"/>
<White Value=" " Start="5" Length="1"/>
<Alpha Value="worked" Start="6" Length="6"/>
<White Value=" " Start="12" Length="1"/>
<Alpha Value="for" Start="13" Length="3"/>
<White Value=" " Start="16" Length="1"/>
<Alpha Value="John" Start="17" Length="4"/>
<White Value=" " Start="21" Length="1"/>
<Alpha Value="Smith" Start="22" Length="5"/>
<Punct Value="," Start="27" Length="1"/>
<White Value=" " Start="28" Length="1"/>
<Alpha Value="the" Start="29" Length="3"/>
<White Value=" " Start="32" Length="1"/>
<Alpha Value="IT" Start="33" Length="2"/>
<White Value=" " Start="35" Length="1"/>
<Alpha Value="company" Start="36" Length="7"/>
<Punct Value="." Start="43" Length="1"/>
<White Value=" " Start="44" Length="1"/>
</Document>
```

Adding a Dictionary Rule

A dictionary rule can be added to the text analytic application by the add to dictionary component 230. Any number of rules can be added to the dictionary. An example of a rule is that the word 'Smith' is a 'Name'. Adding this dictionary rule results in the following:
1. The index creator component 225 performs a check function on the index to determine if there are any references to the term 'Smith' in any of the registered documents (steps 400 to 405 and 410).

2. If the determination is positive, the default annotation is changed from 'Alpha' to 'Name' by the annotation modifying component 245. Note that a particular word or phrase can have only a single default annotation (step 425).
3. The annotation modifying component 245 iterates through all index references for the term 'Smith' and changes the corresponding annotation references, previously 'Alpha', to the new 'Name' annotation (step 430).
4. If the determination is negative the item is created in the index by the index creator component 225 and a reference is added to the index (steps 415 and 420)

Following the addition of the above dictionary rule the annotated XML for Document one, as generated by the XML creator component is:

```
<Document>
<Alpha Value="John" Start="0" Length="4"/>
<White Value=" " Start="4" Length="1"/>
<Alpha Value="called" Start="5" Length="6"/>
<White Value=" " Start="11" Length="1"/>
<Name Value="Smith" Start="12" Length="5"/>
<White Value=" " Start="17" Length="1"/>
<Alpha Value="about" Start="18" Length="5"/>
<White Value=" " Start="23" Length="1"/>
<Alpha Value="John" Start="24" Length="4"/>
<White Value=" " Start="28" Length="1"/>
<Name Value="Smith" Start="29" Length="5"/>
<Punct Value="." Start="34" Length="1"/>
</Document>
```

The XML created, by the XML creator component 225, for Document two is as follows:

```
<Document>
<Name Value="Smith" Start="0" Length="5"/>
<White Value=" " Start="5" Length="1"/>
<Alpha Value="worked" Start="6" Length="6"/>
<White Value=" " Start="12" Length="1"/>
<Alpha Value="for" Start="13" Length="3"/>
<White Value=" " Start="16" Length="1"/>
<Alpha Value="John" Start="17" Length="4"/>
<White Value=" " Start="21" Length="1"/>
<Name Value="Smith" Start="22" Length="5"/>
<Punct Value="," Start="27" Length="1"/>
<White Value=" " Start="28" Length="1"/>
<Alpha Value="the" Start="29" Length="3"/>
<White Value=" " Start="32" Length="1"/>
<Alpha Value="IT" Start="33" Length="2"/>
<White Value=" " Start="35" Length="1"/>
<Alpha Value="company" Start="36" Length="7"/>
<Punct Value="." Start="43" Length="1"/>
<White Value=" " Start="44" Length="1"/>
</Document>
```

Adding a Multi-Word Dictionary Rule

Adding a further dictionary rule stating that 'John Smith' is an 'Organisation' results in the following actions by the text analytic application 200:
1. The rules annotator component 240 performs a check function on the index to determine whether there are any existing references to 'John Smith'. The rules annotator component 240 identifies that there are no existing references to 'John Smith' and therefore a new index item is created in the index by the index creator component 245 (steps 500 to 535).
2. Using the same tokenisation algorithms applied during document registration, the rules engine 220 identifies that the term 'John Smith' comprises multiple words Step 515).
3. The annotation modifying component 245 selects the first word, 'John', and uses the index to determine if any references exist for that term in any of the registered documents. If references are found the annotation modifying component 245 examines each reference in more detail to determine if they are part of the longer phrase 'John Smith' (step 520).
4. Similarly, annotation modifying component 245 selects the second word, 'Smith', and uses the index to determine if any references exist for that term in any of the registered documents. Again, if references are found the rules engine examines each reference in more detail to determine if they are part of the longer phrase, 'John Smith' (step 525).
5. If steps (3) or (4) above identify a matching phrase, the existing references to the individual words 'John' and 'Smith' are deleted and a new reference is added for the term 'John Smith'. The annotations array is also updated by the annotation modifying component 245 so that the existing annotations are replaced with a single new 'Organisation' annotation (step to 530).

The resulting XML for the first example document:

```
<Document>
<Alpha Value="John" Start="0" Length="4"/>
<White Value=" " Start="4" Length="1"/>
<Alpha Value="called" Start="5" Length="6"/>
<White Value=" " Start="11" Length="1"/>
<Name Value="Smith" Start="12" Length="5"/>
<White Value=" " Start="17" Length="1"/>
<Alpha Value="about" Start="18" Length="5"/>
<White Value=" " Start="23" Length="1"/>
<Organisation Value="John Smith" Start="24" Length="10"/>
<Punct Value="." Start="34" Length="1"/>
<White Value=" " Start="35" Length="1"/>
</Document>
```

The XML for the second example document is shown below:

```
<Document>
<Name Value="Smith" Start="0" Length="5"/>
<White Value=" " Start="5" Length="1"/>
<Alpha Value="worked" Start="6" Length="6"/>
<White Value=" " Start="12" Length="1"/>
<Alpha Value="for" Start="13" Length="3"/>
<White Value=" " Start="16" Length="1"/>
<Organisation Value="John Smith" Start="17" Length="10"/>
<Punct Value="," Start="27" Length="1"/>
<White Value=" " Start="28" Length="1"/>
<Alpha Value="the" Start="29" Length="3"/>
<White Value=" " Start="32" Length="1"/>
<Alpha Value="IT" Start="33" Length="2"/>
<White Value=" " Start="35" Length="1"/>
<Alpha Value="company" Start="36" Length="7"/>
<Punct Value="." Start="43" Length="1"/>
<White Value=" " Start="44" Length="1"/>
</Document>
```

Registering More Documents

When a further document is registered, for example Document Three, the document is again tokenised by the tokenise component 215. As each individual word, in Document Three, is identified the index is searched to determine whether the word has already been included in the index. If the word has already been included in the index then the appropriate annotation is automatically applied, otherwise a new index item is created and the default annotation applied. If a word is identified as being the start of a multi-word term already in the index (e.g. 'John Smith') then the annotation modifying component 245 checks to see if the entire term exists; if so the appropriate annotation is applied.

Grammatical Rules

Grammatical rules are applied by the text analytics application in exactly the same manner as dictionary rules. The only difference being that grammatical rules are more hierarchical. Consider a rule that states if a 'Verb' with the text value of 'works' followed by a 'Preposition' with the text value of 'for' followed by a 'Name', then the 'Name' annotation should be changed to an 'Organisation' annotation.

On adding the rule to the text analytic application by the add to dictionary component 230, the index is immediately searched, by rules annotator component 240 to determine matching patterns. This involves multiple tests such as identifying every reference to the work 'works' and then testing whether that word has been annotated as a 'Verb'. If not, then the reference is ignored. The query is easily optimised as the index includes count data so it is possible to start the test with the minimum number of references. In other words if the word 'for' appears less often than the word 'works' then this word is used as the start of the test as the search space is smaller and therefore faster.

Rule Cascading

As discussed earlier, the index and the annotations array comprises a large number of cross references. The annotations array stored in the data store 205 comprises a hierarchical series of references. For example, consider the case where three rules have been created:
1. Rule 1 (Grammatical)—annotates any occurrence of a 'MaleName' as a 'Name'.
2. Rule 2 (Grammatical)—annotates any Organisation that is preceded by the term 'works for' as an 'Employer'.
3. Rule 3 (Dictionary)—annotates the word 'John' as a 'MaleName'.

For the text, 'Smith works for John Smith', the annotated XML would be:

```
<Document>
<Name Value="Smith" Start="0" Length="5"/>
<White Value=" " Start="5" Length="1"/>
<Alpha Value="works" Start="6" Length="6"/>
<White Value=" " Start="12" Length="1"/>
<Alpha Value="for" Start="13" Length="3"/>
<White Value=" " Start="16" Length="1"/>
<Name>
<MaleName Value="John" Start="17" Length="4"/>
</Name>
<White Value=" " Start="21" Length="1"/>
<Name Value="Smith" Start="22" Length="5"/>
</Document>
```

In the event, that a new dictionary rule is added stating that 'John Smith' is an 'Organisation', the index and annotations array are updated as described previously. However, when the 'MaleName' annotation is deleted all related hierarchical annotations are also deleted. This means that the annotation itself is deleted from the annotations array and the reference to the annotation is deleted from the index array. In this case, the 'Name' annotation above the 'MaleName' annotation is deleted.

Having deleted the 'Name' and 'MaleName' annotations by the rules annotation component, the new Organisation annotation is added to the index. An event is sent to the rules engine component 220 stating that a new reference to an annotation has been added to the index. The annotation modifying component 245 identifies any existing rules that include an 'Organisation' as part of the input. In this case, Rule 2 would be identified. The rules engine component 220 uses the index, annotation and document cross referencing in more detail to determine if the rule input pattern exists. If so, the new annotation is inserted and a further event is generated. This process is cascaded until no further rules trigger.

It will be clear to one of ordinary skill in the art that all or part of the method of the embodiments of the present invention may suitably and usefully be embodied in a logic apparatus, or a plurality of logic apparatus, comprising logic elements arranged to perform the steps of the method and that such logic elements may comprise hardware components, firmware components or a combination thereof.

It will be equally clear to one of skill in the art that all or part of a logic arrangement according to the embodiments of the present invention may suitably be embodied in a logic apparatus comprising logic elements to perform the steps of the method, and that such logic elements may comprise components such as logic gates in, for example a programmable logic array or application-specific integrated circuit. Such a logic arrangement may further be embodied in enabling elements for temporarily or permanently establishing logic structures in such an array or circuit using, for example, a virtual hardware descriptor language, which may be stored and transmitted using fixed or transmittable carrier media.

It will be appreciated that the method and arrangement described above may also suitably be carried out fully or partially in software running on one or more processors (not shown in the figures), and that the software may be provided in the form of one or more computer program elements carried on any suitable data-carrier (also not shown in the figures) such as a magnetic or optical disk or the like. Channels for the transmission of data may likewise comprise storage media of all descriptions as well as signal-carrying media, such as wired or wireless signal-carrying media.

A method is generally conceived to be a self-consistent sequence of steps leading to a desired result. These steps require physical manipulations of physical quantities. Usually, though not necessarily, these quantities take the form of electrical or magnetic signals capable of being stored, transferred, combined, compared, and otherwise manipulated. It is convenient at times, principally for reasons of common usage, to refer to these signals as bits, values, parameters, items, elements, objects, symbols, characters, terms, numbers, or the like. It should be noted, however, that all of these terms and similar terms are to be associated with the appropriate physical quantities and are merely convenient labels applied to these quantities.

The embodiments of the present invention may further suitably be embodied as a computer program product for use with a computer system. Such an implementation may comprise a series of computer-readable instructions either fixed on a tangible medium, such as a computer readable medium, for example, diskette, CD-ROM, ROM, or hard disk, or transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink-wrapped software, pre-loaded with a computer system, for example, on a system ROM or fixed disk, or distributed from a server or electronic bulletin board over a network, for example, the Internet or World Wide Web.

In one alternative, an embodiment of the present invention may be realized in the form of a computer implemented method of deploying a service comprising steps of deploying computer program code operable to, when deployed into a computer infrastructure and executed thereon, causes said computer system to perform all the steps of the method.

In a further alternative, an embodiment of the present invention may be realized in the form of data carrier having functional data thereon, said functional data comprising functional computer data structures to, when loaded into a computer system and operated upon thereby, enable said computer system to perform all the steps of the method.

It will be clear to one skilled in the art that many improvements and modifications can be made to the foregoing exemplary embodiment without departing from the scope of the present invention.

The invention claimed is:

1. A rule based apparatus for modifying annotations in an annotated text base comprising a plurality of documents, the apparatus comprising:
    an index creator component that:
        creates an annotation array that indexes annotations assigned to terms in the annotated text base, the annotation array comprising annotations and references for each annotation from the annotated text base; and
        creates an index that indexes the annotated terms in the annotated text base, the index comprising a list of all words in the annotated text base and for each word, the assigned annotation and a list of references;
    an annotations modifying component that modifies annotations in response to implementing rules;
    a retriggering component, responsive to said annotations modifying component modifying a select annotation to an updated annotation, that retriggers a rules engine to:
        modify all annotation occurrences in the index that match the select annotation, to the updated annotation; and
        update the annotation array with a reference to the modified occurrences of the select annotation in the annotated text base.

2. A rule based apparatus as claimed in claim 1 further comprises a tokenizing component that identifies terms including a word, a number or a punctuation marks associated with a document to be stored in the annotated text base.

3. A rule based apparatus as claimed in claim 2 wherein the tokenizing component on identifying a word, a number or a punctuation mark creates a reference to the identified word, number or punctuation mark in the created annotation array.

4. A rule based apparatus as claimed in claim 1 wherein the index creator component further comprises checking in the index to determine if there is already stored a reference to a word in the annotated text base.

5. A rule based apparatus as claimed in claim 4 wherein responsive to a positive determination by the index creator component, the annotation modifying component modifies the annotation associated with the word in the annotated text base to the annotation associated with the determined reference.

6. A rule based apparatus as claimed in claim 1 further comprising:
    an XML creator component that creates an XML representation of the index.

7. A rule based apparatus as claimed in claim 1, wherein the index creator component is further configured to:
    perform a check function on the index in response to executing a dictionary rule, to determine whether there are any terms that match a word specified in dictionary rule; and
    iterate through the index for all indexed terms that match the specified word in the dictionary rule to update the associated annotation.

8. A rule based apparatus as claimed in claim 1, wherein the index creator component is further configured to:
    create a new index entry in response to processing a rule that results in no matches in the index.

9. A rule based apparatus as claimed in claim 8, wherein:
    the index creator component adds a multi-word term to the index; and
    the annotation modifying component is further configured to:
        select the first word of the multi-word term;
        use the index to determine whether any references exist for the first word in any registered documents of the annotated text base;
        examine each located reference to determine whether the located term is part of a longer phrase that matches the multi-word term; and
        updates the annotations array.

10. A rule based apparatus as claimed in claim 1, wherein:
    the index further comprises count data that counts the number of references for each indexed term.

11. A computer-readable storage device with an executable program stored thereon, for modifying annotations in an annotated text base comprising a plurality of documents, wherein the program instructs a processor to perform:
    creating, by the processor:
        an annotation array that indexes annotations assigned to terms in the annotated text base, the annotation array comprising annotations and references for each annotation from the annotated text base; and
        an index that indexes the annotated terms in the annotated text base, the index comprising a list of all words in the annotated text base and for each word, the assigned annotation and a list of references;
    performing, by the processor, responsive to modifying a select annotation to an updated annotation:
        modify all annotation occurrences in the index that match the select annotation, to the updated annotation; and
        update the annotation array with a reference to the modified occurrences of the select annotation in the annotated text base.

12. The computer-readable storage device of claim 11 wherein the program further includes instructions for identifying terms including one of a word, a number or a punctuation mark associated with a document to be stored in the annotated text base.

13. The computer-readable storage device of claim 12 wherein identifying one of the word, the number or a punctuation mark creates a reference to the identified word, number or punctuation mark in the created annotations array.

14. The computer-readable storage device of claim 11 wherein the program further includes instructions for checking in the index to determine if there is already stored a reference to a word in the annotated text based.

15. The computer-readable storage device of claim 14 wherein responsive to a positive determination by the indexing step, the annotation modifying component modifies the annotation associated with the word in the annotated text base to the annotation associated with the determined reference.

16. The computer-readable storage device of claim 11 further comprising:
 an XML creator component that creates an XML representation of the index.

17. The computer-readable storage device of claim 11, wherein the index creator component is further configured to:
 perform a check function on the index in response to executing a dictionary rule, to determine whether there are any terms that match a word specified in dictionary rule; and
 iterate through the index for all indexed terms that match the specified word in the dictionary rule to update the associated annotation.

18. The computer-readable storage device of claim 11, wherein the index creator component is further configured to:
 create a new index entry in response to processing a rule that results in no matches in the index.

19. The computer-readable storage device of claim 18, wherein:
 the index creator component adds a multi-word term to the index; and
 the annotation modifying component is further configured to:
 select the first word of the multi-word term;
 use the index to determine whether any references exist for the first word in any registered documents of the annotated text base;
 examine each located reference to determine whether the located term is part of a longer phrase that matches the multi-word term; and
 updates the annotations array.

20. The computer-readable storage device of claim 11, wherein:
 the index further comprises count data that counts the number of references for each indexed term.

\* \* \* \* \*